United States Patent [19]

Roberts

[11] Patent Number: 4,555,779
[45] Date of Patent: Nov. 26, 1985

[54] SUBMERGED MARINE STREAMER LOCATOR

[75] Inventor: F. Alex Roberts, Brea, Calif.

[73] Assignee: Chevron Research Company, San Francisco, Calif.

[21] Appl. No.: 476,690

[22] Filed: Mar. 18, 1983

Related U.S. Application Data

[63] Continuation-in-part of Ser. No. 215,195, Dec. 10, 1980, abandoned.

[51] Int. Cl.[4] .................... G01S 15/06; G01V 1/38
[52] U.S. Cl. .................................... 367/19; 367/6; 367/130
[58] Field of Search .............. 367/19, 6, 106, 117, 367/130; 181/110; 455/40; 375/6

[56] References Cited

U.S. PATENT DOCUMENTS

| | | | |
|---|---|---|---|
| 3,840,845 | 10/1974 | Brown | 367/19 |
| 3,860,900 | 1/1975 | Scudder | 367/106 |
| 4,087,780 | 5/1978 | Itria et al. | 367/19 |
| 4,097,837 | 6/1978 | Cyr | 367/6 |
| 4,110,726 | 8/1978 | Dorrance et al. | 367/6 |
| 4,229,809 | 10/1980 | Schwalbe | 367/6 |

OTHER PUBLICATIONS

"CW Beacon System for Hydrophone Motion Determination", Porter et al., Journal of Acoust. Soc. Am., vol. 53, #6, 1973.
"Dynamic Positioning System for . . . ", by H. W. Ragland, Honeywell Inc., pp. 1145–1161.

Primary Examiner—Nelson Moskowitz
Assistant Examiner—Ian J. Lobo
Attorney, Agent, or Firm—D. A. Newell; E. J. Keeling; P. L. McGarrigle

[57] ABSTRACT

Method and means are provided for determining the position of a submerged marine streamer towed behind an exploration vessel. An array of at least three transponders secured to the ocean floor generate distinguishable acoustic pulses upon a command signal from the ship. These signals are received by hydrophones housed in the streamer and by the ship. The distance to each hydrophone may be triangulated from the data generated including accounting for changes in velocity between the vessel and the seismic streamer and the bottom transponders during the taking of such data.

10 Claims, 2 Drawing Figures

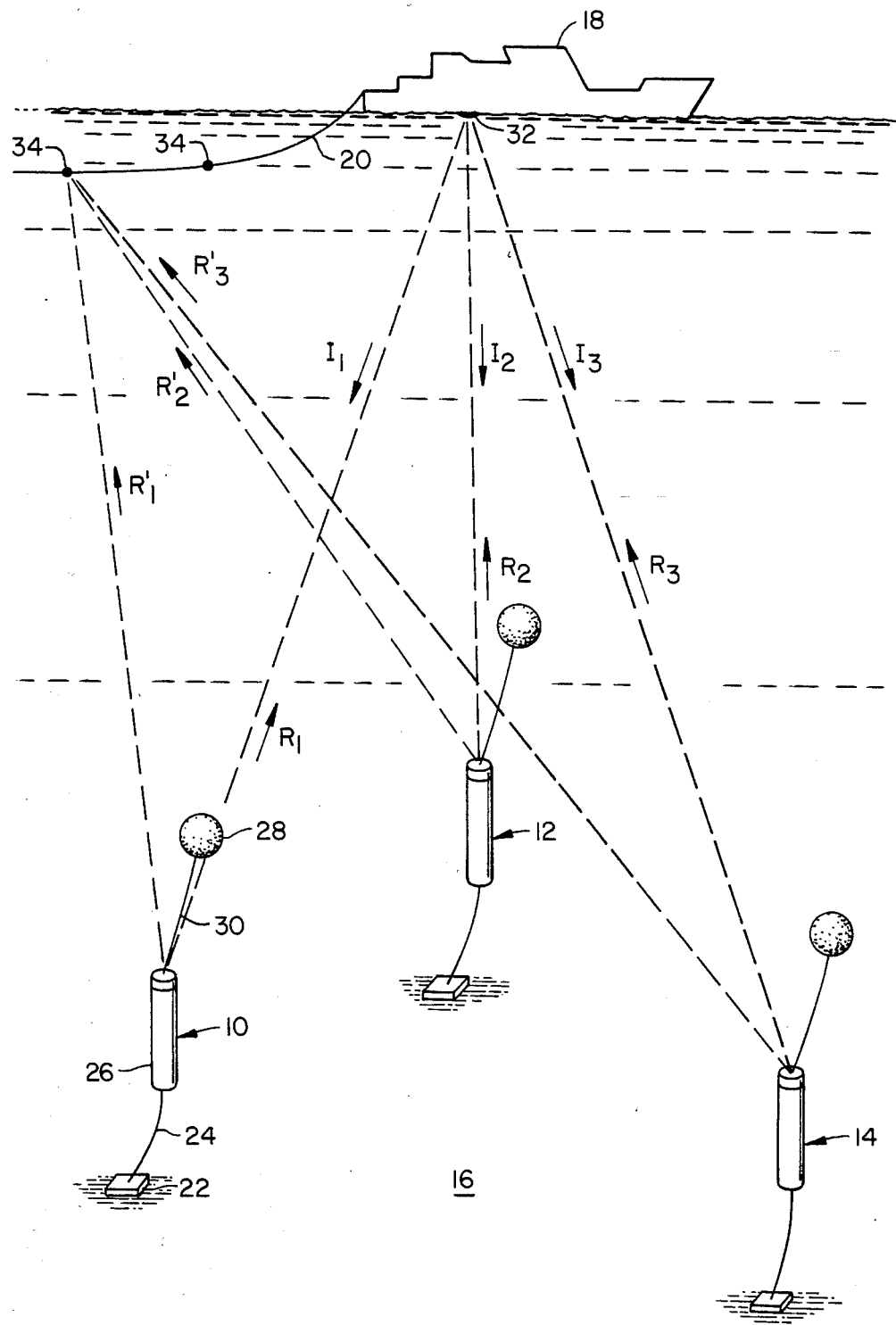
FIG.—1.

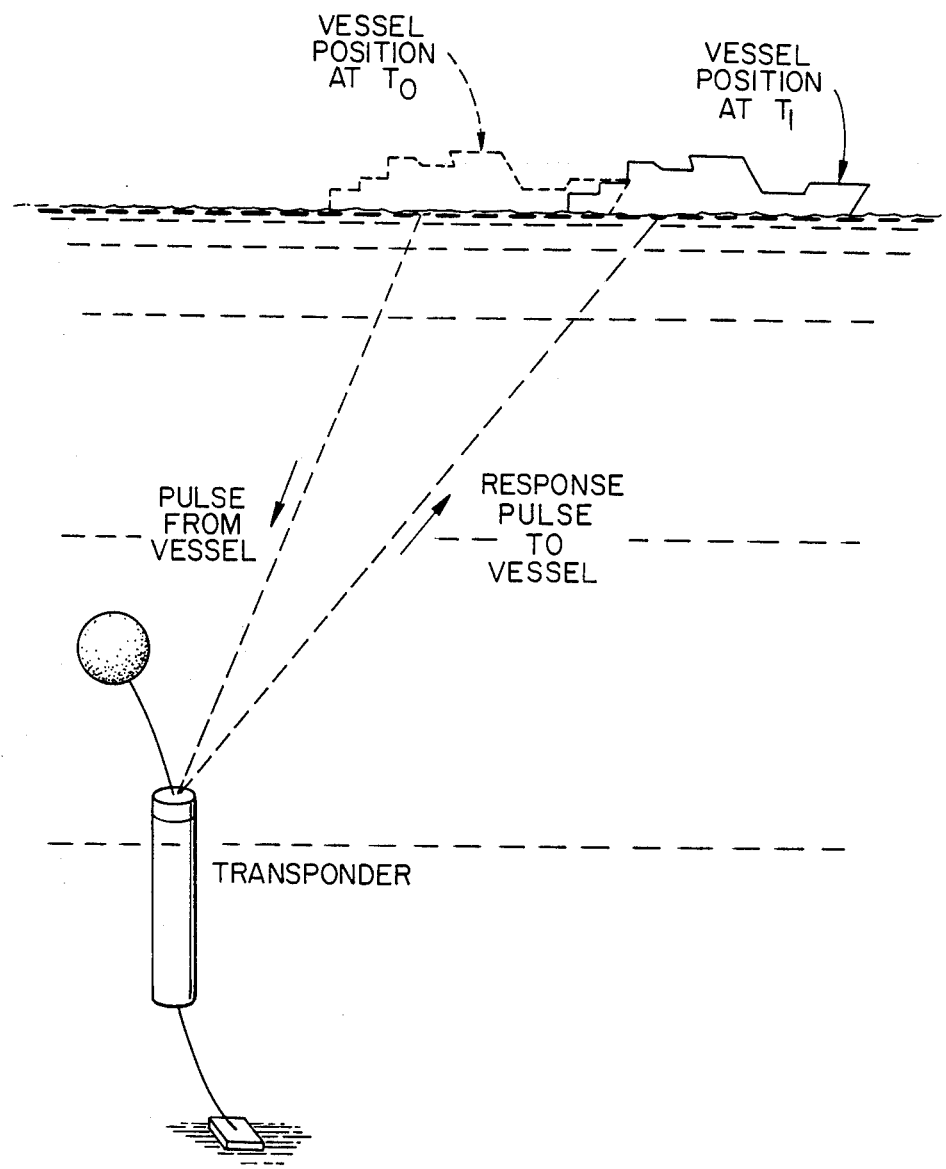
FIG._2.

SUBMERGED MARINE STREAMER LOCATOR

This is a continuation in part of my U.S. application Ser. No. 215,195 filed Dec. 10, 1980, now abandoned.

BACKGROUND OF THE INVENTION

1. Field of the Invention

The present invention finds principal application within the field of marine seismic exploration. More particularly, the invention is concerned with means for accurately determining the position of a towed marine seismic streamer relative to fixed ocean bottom positions, including a correction for relative movement of the tow vessel and streamer with respect to the bottom positions.

2. Prior Art

In marine seismic prospecting, an exploration vessel tows a seismic streamer having a plurality of pressure sensitive detectors, commonly referred to as hydrophones. A source of seismic energy, such as an air gun or an explosive charge, is used to propagate pressure waves through the water into the underlying sea floor. Part of the energy will be reflected by subfloor geological discontinuities and subsequently detected by the hydrophones as pressure variations in the surrounding water. The mechanical energy of these pressure variations is transformed into an electrical signal by the hydrophones and transmitted through the streamer to a recording apparatus aboard the vessel. The collected data may then be interpreted by those skilled in the art to reveal information about the subsea geological formations. Modern methods of seismic data collection use redundant subsurface coverage by successive source-hydrophone positions. This allows the data to be stacked to enhance the signal to noise ratio.

For the signals to be meaningful and to permit correct stacking of signals from different source and hydrophone positions, it is necessary to know the placement of the individual hydrophones at the time the pressure waves are detected. As the vessel is continuously moving and as the streamer may extend for thousands of feet behind the vessel, accurate location of the streamer hydrophones relative to fixed positions at the underwater bottom is difficult.

Various systems have been developed to provide accurate information as to the location of the vessel. In a common application a plurality of underwater transponders generate unique output frequency signals in response to an interrogation signal from the ship. The transit time for the interrogation signal and the transponder's response signal is measured and the distance or range from each transponder is calculated. The vessel's position with respect to the transponders may then be triangulated if the location of the transponders are known.

It has also been proposed to measure the distance from an underwater vessel from a tow vessel using the plural transponders and an additional transponder in the underwater vessel. However, none of the signals received from any of the transponders indicate relative velocity between the bottom positioned transponders and either the towed vessel or any of a plurality of locations along the towed cable.

However, it is rare for the streamer to trail directly along the path of the vessel. While the streamer is attached to the stern of the vessel, the bulk of the streamer is submerged below the water surface through the action of depth controllers along the length of the streamer. As a result, the cross-track current velocity at the streamer depth may differ from the cross-track current affecting the vessel, thereby causing the streamer to trail at an angle to the vessel's course. Other factors, which are not necessary to enumerate, may also create a variance in the path of the streamer when compared to the vessel track.

One method of estimating the location of the streamer disclosed in the prior art relies upon the addition of a tail buoy radar reflector located at the end of the streamer. On-board radar systems may then be used under optimal sea conditions to find the end of the streamer and the location of the individual hydrophones interpolated. Such systems are generally unreliable however, and render the required data suspect.

A second method taught by the art relies upon very sensitive and expensive apparatus to measure the yaw and pitch angles of the streamer end adjacent the vessel. These data, coupled with magnetic compass headings taken along the streamer and the known depth of the streamer, permits one to empirically calculate the hydrophone locations.

It is an object of this invention to provide an accurate, alternative means for locating the submerged streamer relative to known underwater locations which adequately account for relative motion between the streamer and such locations during traverse of a seismic line with the streamer.

SUMMARY OF THE INVENTION

The present invention relates to method and apparatus for determining the location of a submerged marine streamer towed behind an exploration vessel. The system comprises: means for initiating an acoustic command signal from the vessel; at least three transponders spatially located in known positions on the sea floor so as to provide distinct acoustic paths to the vessel and streamer, each of said transponders being capable of responding to the command signal from the vessel by emitting acoustic pulses of distinctly different frequencies; a plurality of spaced receivers carried by the streamer capable of receiving the different acoustic pulses emitted by the transponders and individually relaying distinct signals along the streamer to the vessel responsive to said acoustic pulses; a vessel receiver capable of receiving and distinguishing the different acoustic pulses emitted from the transponders; and means for measuring the time interval from initiation of the command signal to receipt of the signals relayed from the spaced receivers housed by the streamer, the time interval from initiation of the command signal to receipt of the pulses by the vessel receiver from the transponders and means for determining the vector velocity of the towing vessel relative to each of the plurality of bottom transponders.

Preferably, the transponders are placed in a noncolinear relationship and each streamer receiver is serviced by a separate channel housed in the streamer for relaying signals to the vessel. The receivers may be either active or passive, but are preferably passive to minimize weight and expense. The apparatus further comprises means for measuring the vessel's vector velocity with respect to the array of transponders situated on the ocean floor. Said means for measuring the vessel's velocity may include apparatus for measuring the Doppler shift in the frequency of the pulses generated by the transponders. Most preferrably, the same transponders and vessel receiver are used to measure the vessel velocity by establishing a seismic traverse line and recording a plurality of discrete measurements of vessel speed along said line with respect to each transponder and then progressively averaging the same number of measurements for each transponder. Such progressive average may be taken by dropping the earliest of the measurements, say the first of three, and then adding the next value. This method provides excellent accuracy to identify the location of each receiver with respect to each bottom transponder, at little added cost and no greater complexity of apparatus, since accelerations or changes of speed of the vessel are inherently slow between successive location data acquisition times when the vessel is on such a seismic data taking run. Further any such accelerations, positive or negative, may be further compensated for by properly weighting the values used in each average.

BRIEF DESCRIPTION OF THE DRAWINGS

FIG. 1 is a perspective elevation view illustrating an underwater bottom transponder array shown in relationship to a surface exploration vessel towing a marine streamer.

FIG. 2 is a perspective view similar to FIG. 1 which diagrammatically illustrates the effect of ship movement on the acoustic paths between vessel and transponders.

DETAILED DESCRIPTION OF THE PREFERRED EMBODIMENTS

The present invention requires the placement of a plurality of acoustic transponders on, or adjacent, the ocean bottom. Preferably, the transponders will be positioned on the sea floor in non-colinear arrays of at least three transponders per array. Each transponder in a given triplet is preferably placed at a sufficient distance apart to give adequate range to the ship and streamer receivers in a given water depth. While the present invention is concerned with location of the vessel and different portions of a streamer with respect to a given array and not with respect to the actual geographical location, the latter relationship may be established from knowledge of the transponder placement. Well known methods are described in the art for determination of the transponder placement and calibration and are therefore not to be considered here.

Referring to FIG. 1 of the drawings, there is shown a single array of three acoustic transponders, indicated generally by reference numerals 10, 12 and 14, positioned on the sea floor 16. An exploration vessel 18 is shown on the surface towing a streamer 20.

Transponders of the type required are commercially available and normally comprise a base plate 22, resting on the sea floor, and a cable 24 attached between the base plate 22 and the transponder body 26. A float 28 connected to the transponder body 26 by means of a cable 30 maintains the transponder body 26 at an attitude above the sea floor determined by the length of cable 24. Float 28 also provides a means of retrieval if cable 24 is severed.

Vessel 18 is equipped with an acoustic transceiver 32 for sending command or interrogating acoustic signals through the water to the transponders and, in turn receiving responsive signals therefrom. Preferably, all transponders in the array will respond to a single frequency signal emitted by the vessel's transceiver, however, coded signals may be generated to actuate the individual transponders from the vessel, if desired.

The marine streamer 20 is submerged below the water surface by a plurality of conventional depth controllers (not shown) and will normally house hydrophones (not shown), and depth sensors (not shown) which may be interrogated from the vessel for information.

In addition, the streamer will also house a plurality of acoustic receivers 34 spaced along the length of the streamer. Receivers 34 are capable of detecting the signals generated by the transponders and relaying indentifiable responses along the streamer to the vessel. Normally the streamer will have individual channels leading from each receiver to the vessel for transmitting the information. Although the receivers may be active, or powered, it is preferred that the receivers be passive.

To determine the location of each receiver 34 along the length of streamer, independent of its expected location, the vessel's acoustic transceiver 32 is triggered to send an acoustic command signal. Upon receipt of the signal, after the necessary delay due to transmission time through the water, each transponder transmits an acoustic pulse of a distinguishable frequency. These pulses are detected by transceiver 32 and by the acoustic receivers 34 housed in the streamer. For the sake of clarity, acoustic travel paths are only shown in FIG. 1 of the drawing as dashed lines for the vessel transceiver, transponders, and a single receiver in the streamer. It should be understood, however, that similar paths could be drawn for each of the receivers housed in the streamer. Arrows $I_1$, $I_2$ and $I_3$ represent the command pulse traveling along the dashed lines from the ship to the transponders: Arrows $R_1$, and $R_2$, and $R_3$ represent the responsive pulses from the transponders to the vessel, and arrows $R'_1$, $R'_2$ and $R'_3$ indicate the pulse lines of travel to one of the receivers housed in the streamer. Since the spatial positions of the transponders on the sea floor and the speed of sound through the water are known, the receiver positions may be calculated from the travel times of the detected pulse from the transponders, provided the time that each transponder replied to the command pulse is known.

Suitable means aboard the vessel are provided to measure the respective time intervals between the sending of the command signal and the receipt of the pulses from each transponder and the resulting pulses from each receiver.

In FIG. 2 of the drawings, there is illustrated a single vessel moving along the water's surface at time $T_0$ and at a subsequent time $T_1$. As shown therein, the vessel's transceiver initiates a pulse at time $T_0$ which travels along the indicated path to the transponder. Upon receipt of the signal at time $T_d$ the transponder transmits a pulse with is detected by the vessel transceiver at time $T_1$. From the figure it may be derived that the time, $T_d$, the time of the transponder reply to the command pulse, is given by the formula:

$$T_d = T_0 + \frac{(T_1 - T_0)}{2}\left(1 - \frac{\vec{v}}{c}\right)$$

wherein v is the vessel's vector velocity with respect to the transponder and c is the propagation speed of the acoustic pulses.

The ratio $$\left|\frac{\vec{v}}{c}\right|$$

for normal ship speeds during seismic operations will usually be less than 0.002, since $|v|$ has a maximum magnitude of about 3 meters per second for seismic operations and c is about 1,500 meters per second. If the v/c term is dropped then:

$$T_d = T_0 + \frac{(T_1 - T_0)}{2}$$

with an error of 0.2% or less. An error of this magnitude may be acceptable for the ocean depths encountered in the oil industry for some types of seismic operations, but in general only for reconnaisance surveys, not locating potential well drill sites, or detailed high resolution structure surveys.

In relatively shallow water and where the bottom transducers are closely spaced, say less than a mile apart, such an error can seriously deteriorate the value of the collected seismic data since the structural details will not be adequately defined from such data. For example, for seismic data taken with the transponders spaced apart from each other two miles and at an average depth of 500 feet, positional error of the hydrophones would be on the order of from 2 to 40 feet. Positional errors of this magnitude can mask and possibly obliterate important structural details in the data stacking process.

The v/c ratio may be determined in a number of ways. For greatest technical accuracy of such determination a preferred method relies upon measurement of the Doppler shift in the received frequency from the transponder. Naturally, in order to determine the velocity in this manner, the transponders must be capable of generating pulses of very stable frequencies and the vessel receiver must be capable of measuring the apparent change in the frequency.

Because the initial cost of such stable frequency transponders, as well as cost for their maintenance, may not be justifiable, a simpler yet highly effective method for obtaining such data is provided in accordance with the present invention which employs only the passive, or low-power active detectors in the seismic cable, as described above, and the same bottom transponders. Accordingly, an economically preferred method of calculating this ratio is from the rate of change of range between the transponders and the vessel. This range rate may be determined readily from a knowledge of the vessel's position change with respect to the transponders.

Specifically, the value $|v|$ is, of course, $\delta R/\delta t$, the rate of change of range in the direction of the vessel relative to each ocean bottom transponder. This range rate is available from a plurality of measurements of the recorder range data. In practice, the seismic vessel is required to run a track of 3 to 4 kilometers in line with the seismic data line to straighten the streamer before the seismic data taking run begins. Because the vessel speed is normally less than 3 meters per second and at constant headway, its track is straight over several recordings of the range position. In this way, the average change in range of the vessel relative to each transponder is available by recording and averaging several range measurements. For example three determinations of range may be averaged and then for successive measured positions and using each new measurement of range, the first or earliest of the three measurements is dropped and the last, or newest, measurement added and the new total averaged together. Initial values of v may be assumed from vessel speed, (or even equated to zero) and then made to converge to the average value from progressive updating of a few sets of such measurements. In this way, the average rate of change in vessel velocity is recorded for solution of the ship triangulation problem with a high degree of accuracy, but without use of additional costly equipment as to either bottom transponders or vessel and cable detection equipment.

With such averaged velocities, perceptible accellerations or decellerations of even one meter per second per second may be tolerated with less than 10% error in the velocity correction of the range data. In fact such average may be made responsive to such accellerations of the vessel, either positively or negatively, by weighting the values averaged together either arithmetically, geometrically or logarithmically in favor of the latest values used in the average. While it will be apparent that corrections can be made for each cable detector relative to each bottom transponder such velocity corrections can be obtained using only the vessel detector where the seismic data taking line is maintained substantially straight.

Knowledge of the time, $T_d$, for the initiation of the pulses from the transponders and the measured time of pulse detection by the receivers in the streamer, as transmitted to the vessel, permits the calculation of the distance from each transponder to each receiver. These distances may then be triangulated to give the location of each receiver in a streamer in real time by a shipboard computer or from the recorded data in post mission analysis and the precise location of the detectors relative to the underwater bottom position on the seismic traces established.

I claim:

1. Apparatus for use in determining the position, relative to a plurality of known geographic locations on a sea floor, of a submerged marine streamer being towed through the sea by an exploration vessel, which comprises:

means for initiating an acoustic command signal from the vessel while moving through the sea;

at least three transponders spatially located in known positions on the sea floor so as to provide distinct acoustic paths to said vessel and to a streamer towed by said vessel, each of said transponders capable of responding to a single command signal from said vessel by emitting acoustic signals of a distinctly different frequency from each of the other of said transponders;

a plurality of spaced apart receivers carried by said streamer, each capable of receiving said different frequencies of acoustic signals emitted by each transponder and each individually relaying a distinct signal along the streamer to the vessel representative of each of said received signals;

at least one vessel receiver capable of receiving and distinguishing said distinctly different acoustic frequencies emitted from said transponders;

means for recording the time interval from initiation of a command signal from said vessel to receipt of each signal relayed from said spaced receivers along said streamer, means for recording the time interval from initiation of said command signal to receipt of a signal from each of said transponders by said vessel receiver, and means for determining the velocity of said vessel receiver relative to each of said transponders whereby the distance of each of said streamer receivers from each of said known positions of said transponders may be calculated.

2. Apparatus in accordance with claim 1 wherein said velocity determining means includes means for averaging a plurality of the recorded time intervals detected by said vessel receiver from each of said transponders.

3. Apparatus in accordance with claim 1 wherein said velocity determining means includes means for averaging a plurality of recorded time intervals detected by each of a plurality of said receivers from each of said transponders.

4. Apparatus in accordance with claim 1 wherein said transponders are in a non-colinear relationship.

5. Apparatus in accordance with claim 1 wherein each of said streamer receivers is passive.

6. Apparatus in accordance with claim 1 wherein each of said streamer receivers is serviced by a separate transmission channel in said streamer for relaying transducer signals to the vessel.

7. A method for determining the location of a submerged marine seismic streamer while being towed by an exploration vessel, which comprises:

positioning at least three transponders at known spaced apart locations on a sea floor;

towing a marine seismic streamer from an exploration vessel in the sea generally above said transponders;

generating an acoustic command signal from said vessel on a periodic basis;

receiving said acoustic command signal by each of said at least three transponders and in response to said acoustic command signal generating a distinctly different acoustic signal from each of said transponders;

detecting each of the transponder acoustic response signals at the vessel receiver;

detecting each of the transponder acoustic response signals at a plurality of receivers spaced apart along said streamer;

relaying a distinct signal along said streamer in response to each of said detected signals for recording thereof at said vessel and separately recording each of said transponder acoustic signals at said vessel;

measuring the time intervals from generation of said command signal to receipt of each of said transponder acoustic response signals by at least one receiver at said vessel;

determining the velocity of said at least one vessel receiver relative to each of said transponders by calculating the rate of change of range from a plurality of said time intervals corresponding to successive signals from each of said transponders being received by said vessel receiver;

calculating the initial time of generation of an acoustic response from said transponders; and measuring the time intervals from generation of said transponder acoustic response signals to receipt of each of said response signals relayed from said spaced receivers along said streamer;

whereby the distance of each of said streamer receivers from each of said known positions of said transponders may be calculated.

8. A method as recited in claim 7, further comprising:

successively measuring the average rate of change in range of said at least one vessel receiver with respect to each of said transponders from changes in the measured time for signal travel from each of said transponders to said receiver in response to each acoustic command signal during a plurality of successive generations of said acoustic command signals by including the last measured value of range of a given plurality and dropping the earliest measured value.

9. The method of claim 7 wherein said vessel position relative to each bottom transponder is determined utilizing the time $T_d$ which is determined in accordance with the formula $$T_d = T_0 + \frac{(T_1 - T_0)}{2}\left(1 - \frac{\vec{v}}{c}\right)$$

wherein $T_d$ is the time of a transponder reply to a command pulse, $T_0$ is the time of command pulse initiation, $T_1$ is the time said transponder pulse was received, v is the vessel vector velocity, and c is the propogation speed of the acoustic pulses and wherein v/c is determined from a plurality of successive vessel positions.

10. The method of claim 9 wherein the initial value of v is estimated.

* * * * *

UNITED STATES PATENT AND TRADEMARK OFFICE
CERTIFICATE OF CORRECTION

PATENT NO. : 4,555,779
DATED : November 26, 1985
INVENTOR(S) : F. ALEX ROBERTS

It is certified that error appears in the above-identified patent and that said Letters Patent are hereby corrected as shown below:

Col. 5, line 34, "v/c", should read --$\vec{v}/c$--.

Col. 5, line 55, " v ", should read --$\vec{v}$--.

Col. 5, line 7, " v ", should read --$\vec{v}$--.

Col. 6, line 5 " v ", should read --$\vec{v}$--.

Col. 8, line 44, " v " should read --$\vec{v}$--.

Col. 8, line 46, "v/c" should read --$\vec{v}/c$--.

Col. 8, line 49, " v " should read --$\vec{v}$--.

Signed and Sealed this

Third Day of June 1986

[SEAL]

Attest:

DONALD J. QUIGG

Attesting Officer   Commissioner of Patents and Trademarks